(No Model.)

E. G. QUEEN.
ANIMAL TAG.

No. 267,931. Patented Nov. 21, 1882.

WITNESSES:

INVENTOR:
E. G. Queen
BY
ATTORNEYS.

UNITED STATES PATENT OFFICE.

ELIAS G. QUEEN, OF BIG VALLEY, TEXAS.

ANIMAL-TAG.

SPECIFICATION forming part of Letters Patent No. 267,931, dated November 21, 1882.

Application filed September 7, 1882. (No model.)

*To all whom it may concern:*

Be it known that I, ELIAS G. QUEEN, of Big Valley, in the county of Lampasas and State of Texas, have invented a new and Improved Animal-Tag, of which the following is a full, clear, and exact description.

The object of my invention is to provide a new and improved tag for animals, which tag is to contain papers, &c., bearing information in regard to the animal.

The invention consists in an animal-tag formed of a tube provided with a removable cover and an elongated staple for the strap, by which this tube is held to the animal.

Reference is to be had to the accompanying drawings, forming part of this specification, in which similar letters of reference indicate corresponding parts in both the figures.

Figure 1:
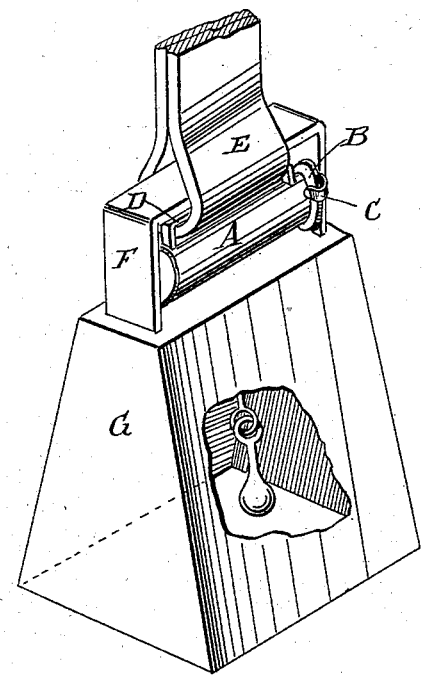
Figure 2:
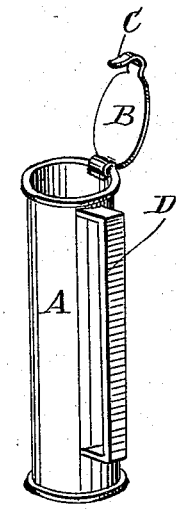

Figure 1 is a perspective view of a cattle-bell to which my improved animal-tag is attached, part of the bell being broken out. Fig. 2 is a perspective view of the tag, showing it opened.

A tube or lengthened box or casing, A, preferably made of metal, is closed at one end, and at the opposite end is provided with a hinged cover, B, which can be secured and locked on the tube by means of a spring-tongue, C, or any other suitable device. The tube A is provided with an elongated staple, D, through which a strap, E, can be passed to secure the tube on the animal's neck.

If desired, the tube A can be held within the staple F of a bell, G, the strap E passing through the staple D of the tube A, and through the staple F of the bell, as shown in Fig. 1.

Papers or documents bearing the name of the owner of the cattle, or other information in relation to the animal, are placed into the tube or casing A, which is then closed. This tube or casing is to be made very small, so that it will not molest the animal.

Having thus fully described my invention, I claim as new and desire to secure by Letters Patent—

A stock-tag consisting of the tube A, constructed with a staple, D, on the side, closed at one end and provided at the other with a hinged cover adapted to be held closed by any suitable fastening, whereby it may be secured to the top of a bell, as shown and described, for the purpose specified.

ELIAS G. QUEEN.

Witnesses:
MATTHEW ROACH,
PORTER STOCKTON.